US010788664B2

(12) United States Patent
Rumala et al.

(10) Patent No.: US 10,788,664 B2
(45) Date of Patent: Sep. 29, 2020

(54) SCANNING AN OPTICAL BEAM ABOUT A FIELD OF REGARD WITH NO MOVING PARTS (71) Applicant: Northrop Grumman Systems Corporation, Falls Church, VA (US)

(72) Inventors: Yisa S. Rumala, New York, NY (US); Gregory Luther, Wallingford, CT (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 364 days.

(21) Appl. No.: 15/928,347

(22) Filed: Mar. 22, 2018

(65) Prior Publication Data
US 2019/0293929 A1 Sep. 26, 2019

(51) Int. Cl.
*G02B 27/00* (2006.01)
*G01S 17/10* (2020.01)
*G01S 7/481* (2006.01)
*G01S 17/42* (2006.01)
*G02B 5/00* (2006.01)
(Continued)

(52) U.S. Cl.
CPC ........ *G02B 27/0087* (2013.01); *G01S 7/4814* (2013.01); *G01S 7/4816* (2013.01); *G01S 7/4817* (2013.01); *G01S 7/4818* (2013.01); *G01S 17/10* (2013.01); *G01S 17/42* (2013.01); *G02B 5/001* (2013.01); *G02B 5/08* (2013.01); *G02B 5/28* (2013.01); *G02B 26/10* (2013.01); *G01S 7/497* (2013.01)

(58) Field of Classification Search
USPC ........................................................ 356/5.01
See application file for complete search history.

(56) References Cited

U.S. PATENT DOCUMENTS 4,353,650 A * 10/1982 Sommargren ....... G01B 11/303
356/369
4,696,574 A * 9/1987 Penney .................. B25J 13/089
356/614
(Continued)

OTHER PUBLICATIONS

Notification of Transmittal of the International Search Report and the Written Opinion of the International Searching Authority, or the Declaration issued in related PCT Application No. PCT/US2019/019830, dated Jun. 26, 2019, 13 pages.
(Continued)

*Primary Examiner* — James R Hulka
(74) *Attorney, Agent, or Firm* — McCracken & Gillen LLC (57) ABSTRACT

An exemplary optical apparatus includes a coherent source of light having a frequency controlled by command signals. One surface of a spiral phase plate resonator receives the light and the light exits from different regions of another surface dependent on the frequency of the light. A fixed reflector is mounted adjacent the another surface to reflect the exiting light at about a 90 degree angle relative to the path of the exiting light. A source of the command signals sends different values of the command signals to the coherent light source to produce corresponding frequencies of the light that determine a particular region from which the light exits the another surface and hence a location on the fixed reflector where the light will be reflected. By changing the frequency of the light, the light is output in a plane by the optical apparatus with no physically moving components.

23 Claims, 5 Drawing Sheets

(51) Int. Cl.
*G02B 5/28* (2006.01)
*G02B 26/10* (2006.01)
*G02B 5/08* (2006.01)
*G01S 7/497* (2006.01)

(56) References Cited

U.S. PATENT DOCUMENTS

| | | | | |
|---|---|---|---|---|
| 5,150,170 | A * | 9/1992 | Morris | G01P 3/36 356/28.5 |
| 5,267,016 | A * | 11/1993 | Meinzer | G01S 17/32 356/3 |
| 5,465,142 | A | 11/1995 | Krumes et al. | |
| 5,675,661 | A | 10/1997 | Richman et al. | |
| 5,981,941 | A * | 11/1999 | Takata | G01D 5/38 250/231.16 |
| 6,078,384 | A * | 6/2000 | Dammann | G01P 5/26 356/28.5 |
| 6,879,419 | B2 | 4/2005 | Richman et al. | |
| 7,113,289 | B1 * | 9/2006 | Beary | G01S 3/784 356/620 |
| 8,120,754 | B2 | 2/2012 | Kaehler | |
| 8,376,218 | B2 | 2/2013 | Jalali et al. | |
| 8,870,060 | B2 | 10/2014 | Jalali et al. | |
| 9,304,199 | B2 | 4/2016 | Kreitmair-Steck et al. | |
| 9,360,554 | B2 | 6/2016 | Retterath et al. | |
| 9,841,495 | B2 * | 12/2017 | Campbell | G01S 7/4812 |
| 9,927,515 | B2 * | 3/2018 | Keller | G01S 7/4817 |
| 10,520,602 | B2 * | 12/2019 | Villeneuve | G01S 17/931 |
| 2004/0114205 | A1 * | 6/2004 | Richman | G02B 13/06 359/203.1 |
| 2010/0208235 | A1 * | 8/2010 | Kaehler | G01S 7/4817 356/5.01 |
| 2011/0168776 | A1 * | 7/2011 | Jalali | G06K 7/1439 235/385 |
| 2013/0221102 | A1 * | 8/2013 | Jalali | G06K 7/10831 235/462.01 |
| 2014/0292556 | A1 * | 10/2014 | Kreitmair-Steck | G01S 13/935 342/29 |
| 2015/0293228 | A1 * | 10/2015 | Retterath | G01S 7/481 356/5.01 |
| 2016/0377706 | A1 | 12/2016 | Keller et al. | |
| 2017/0131387 | A1 | 5/2017 | Campbell et al. | |
| 2017/0155225 | A1 | 6/2017 | Villeneuve et al. | |
| 2017/0242103 | A1 | 8/2017 | Dussan | |

OTHER PUBLICATIONS

Anonymous, Circular Variable Filters, Oct. 1, 2012, 2 pages.
M. Massari et al., "Fabrication and characterization of high quality spiral phase plates for optical applications", Applied Optics, vol. 54, No. 13, May 1, 2015, pp. 4077-4083.
Z. Yaqoob and N. A. Riza, Passive Optics No-Moving-Parts Barcode Scanners, IEEE Photon. Technol. Lett., 16(3) 54-956 (2004).
Rumala, Y. & Leanhardt, A., 2013. Multiple beam interference in a spiral phase plate. Journal of the Optical Society of America B, 30(3), pp. 615-621.
Rumala, Y. S., 2014. Interference theory of multiple optical vortex states in spiral phase plate etalon: thick-plate and thin plate approximation. Journal of the Optical Society of America B, 31(6), pp. A6-A12.
Rumala, Y. S., 2015. Propagation of structured light beams after multiple reflections in a spiral phase plate. Optical Engineering, 54(11), p. 111306.
Rumala, Y. S., 2015. Wave transfer matrix for a spiral phase plate. Applied Optics, 54(14), pp. 4395-4402.
Rumala, Y. S., 2016. Sensitivity in frequency dependent angular rotation of optical vortices. Applied Optics, 55(8), pp. 2024-2033.

* cited by examiner

Fig. 10

SCANNING AN OPTICAL BEAM ABOUT A FIELD OF REGARD WITH NO MOVING PARTS

TECHNICAL FIELD

Embodiments of the invention relate to scanning of a light beam about a substantial field of regard without physical movement of any component parts to achieve the scanning.

BACKGROUND

There are a variety of applications in which it is required to sweep a beam of light about a field of regard. One such example is light detection and ranging (LIDAR) which is used in many applications, e.g. mapping terrain using aerospace vehicles, self-driving cars, mapping stationary objects, constructing 3D models of rooms and other objects for use in a variety of computer applications including for instance games and social media or communication applications etc. Indeed, even at the microscopic imaging scale, a robust, fast and wide angle scanning technology has great utility. The optics hardware of a LIDAR system typically consists of a light source, an element to cause scanning of the light beam, and detector(s) for detecting light reflection. In many applications there is an interest in scanning the beam about a field of view (FOV) of up to a full 0 to 360 degrees, such as for autonomous unmanned aerospace vehicles, manned aerospace vehicles, and self-driving cars. To scan a light beam such as for use in a LIDAR system, techniques have typically made use of movable mechanical components. In many cases, the light beam scanning component is a mirror that is rotated to redirect a fixed beam of light directed towards the mirror, or the light beam source is mounted on a gimbal and the gimbal is rotated. A mirror mounted to an electro-mechanical component, e.g. a piezoelectric element, can be controlled to change the direction it faces. Regardless of the mechanical and/or electrical component that provides the force to produce the change, a physical change of position, of the mirror or of the light source itself, is utilized. It is challenging to achieve a full 0 to 360 degree projective scanning range in a single LIDAR system without using movable parts in the light beam disbursing system. Also, the speed of rotation is limited by these mechanics as well as the usual wear considerations for a component expected to perform a very large number of cycles over its lifetime. There exists a need for an optical scanner that can scan a light beam about a substantial FOV without using movable components, especially if operated at high scan rates.

SUMMARY

It is an object of the present invention to satisfy this need.

An exemplary optical apparatus includes a coherent source of light having a frequency controlled by command signals. One surface of a spiral phase plate resonator receives the light and the light exits from different regions of another surface dependent on the frequency of the light. A fixed reflector is mounted adjacent the another surface to reflect the exiting light at about a 90 degree angle relative to the path of the exiting light. A source of the command signals sends different values of the command signals to the coherent light source to produce corresponding frequencies of the light that determine a particular region from which the light exits the another surface and hence a location on the fixed reflector where the light will be reflected. By changing the frequency of the light, the light is output in a plane by the optical apparatus with no physically moving components.

Another exemplary embodiment includes a method for scanning a light beam about a substantial FOV without using movable components.

BRIEF DESCRIPTION OF THE DRAWINGS

Features of exemplary implementations of the invention will become apparent from the description, the claims, and the accompanying drawings in which:

DETAILED DESCRIPTION

Aspects of an embodiment of the present invention reside in the recognition of the drawbacks associated with the use of moving components to cause the scanning of a light beam and that by controlling the frequency of a light beam transmitted through a spiral phase plate resonator (SPPR), the transmitted light can be scanned over a substantial field of regard, e.g. 0 to 360°, with the aid of a fixed conical reflector without using any physically movable components. One exemplary application for such an embodiment is in a LIDAR system. Although an embodiment of the invention is described in the context of use in a LIDAR system, it will be apparent to those skilled in the art that other uses exist where it is desired to controllably scan a beam of light about a FOV without using physically movable components.

Referring to FIGS. 1-5, an exemplary LIDAR 100 incorporates an embodiment of the present invention. A frequency adjustable laser 105, such as a DFB (distributed feedback) diode laser or DFB fiber laser or external cavity tunable diode laser, may have its output coupled by a single mode fiber 107 (or single mode waveguide) to an isolator 110 that prevents reflections back to the laser. The output of the laser 105 as coupled through the fibers 107 has a beam with a typically circular beam shape with substantially uniform phase front in the preferred embodiment which is then coupled to the optical director 120 which provides an output light beam 125 that can be controllably rotated from 0 to 360 degrees within a plane without using components that must be physically moved to achieve the rotation of the beam. Reflected light 130, that is the portion of the light beam 125 reflecting from objects, is detected by the optical detector 135. A controller 140 provides a signal on control line 145 as coupled to the laser 105 where the signal controls the output frequency of the laser 105. As will be further explained, the sweep of the output beam 125 is controlled as a function of the frequency of the laser 105. Data from the optical detector 135 is coupled to the controller 140. In an initial setup/calibration of the device, this data can be used to calibrate the direction of the output light beam 125 versus the signal value needed to control the frequency of the laser 105 to cause the output beam 125 to be at a corresponding 360 degree heading. An exemplary setup calibration could include generating a stored table of signal values versus corresponding beam headings where the beam heading is determined by the optical detector which is capable of determining the direction of the reflected light. An exemplary uniform environment may surround the LIDAR during the calibration, such as placing the LIDAR inside a cylinder of a given radius to achieve consistent light reflections. In operation of the LIDAR 100 following calibration, the controller can also be used to store and process the detected reflected light information to determine ranging/distance to objects at different headings.

Figure 1:
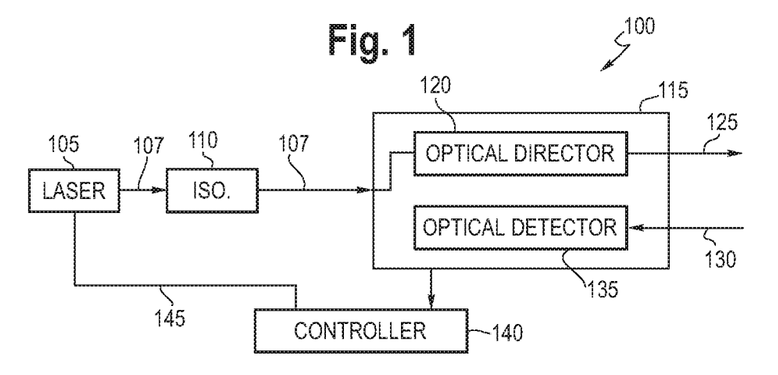
FIG. 1 is a block diagram of an exemplary LIDAR that incorporates an embodiment of the present invention.
Figure 2:
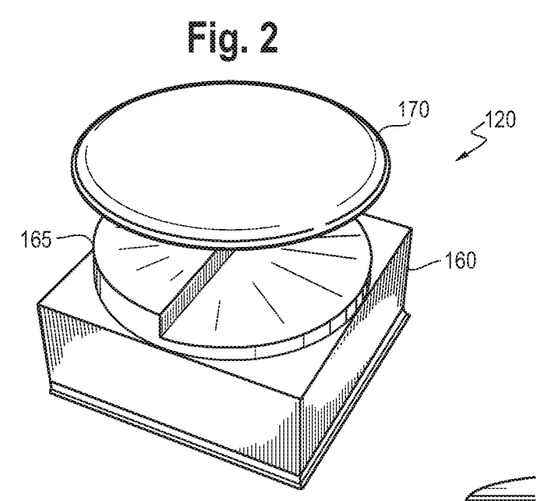
FIG. 2 is a perspective view of an embodiment of the present invention.
Figure 3:
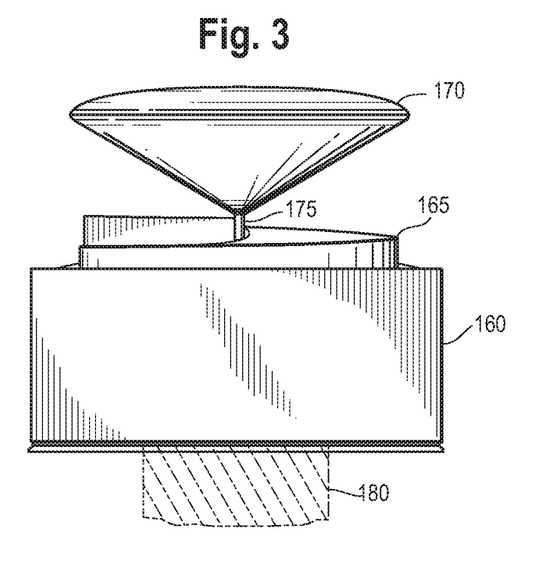
FIG. 3 is a side view of an embodiment of the present invention.
Figure 4:
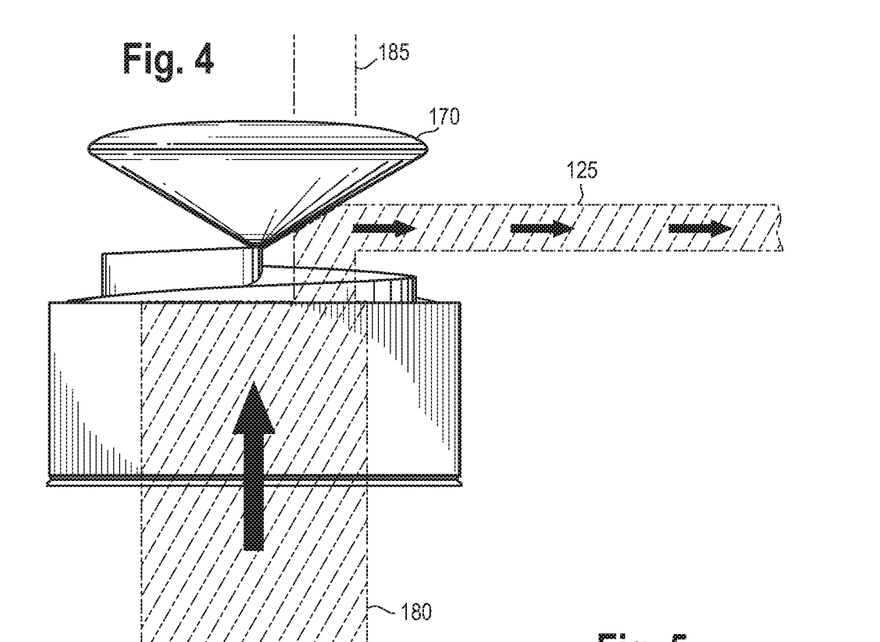
FIG. 4 is a side view of an embodiment of the present invention illustrating the redirection of a beam of light in one direction.
Figure 5:
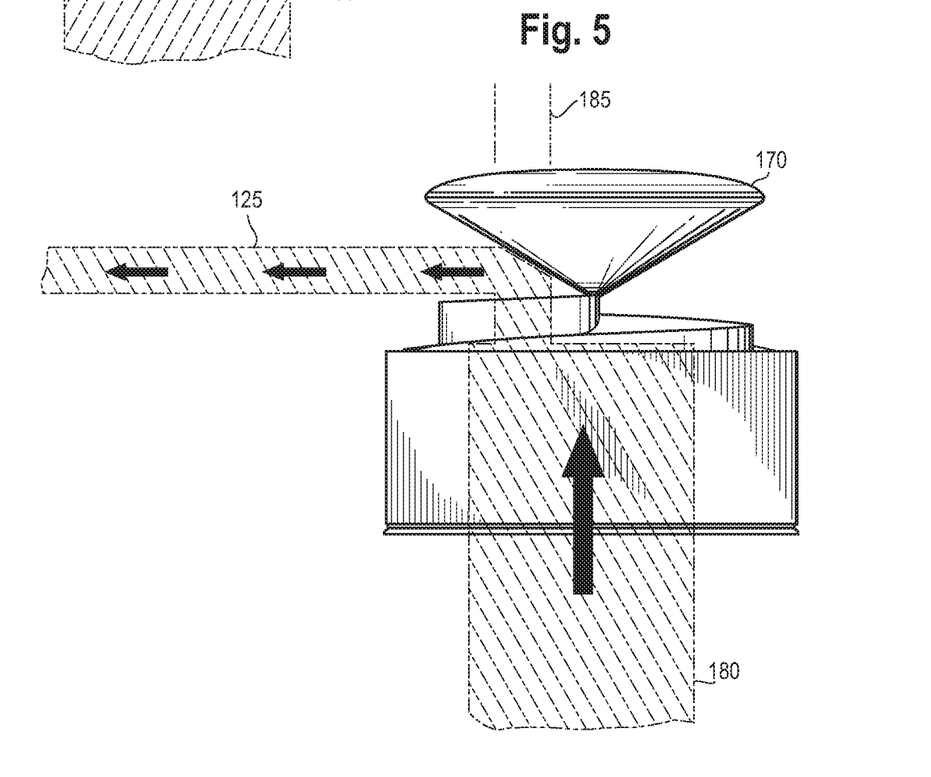
FIG. 5 is a side view of an embodiment of the present invention illustrating the redirection of a beam of light 180° opposite the light as shown in FIG. 4.

In the exemplary embodiment, the optical director 120 includes a spiral phase plate resonator (SPPR) 160. One face of the SPPR 160 includes a spiral surface 165 that spirals about a center axis 175. A slanted mirror or reflector 170, such as a conical shaped mirror, is mounted above the top of the spiral surface 165 of the SPPR. The axis of the conical mirror is in line with the axis 175. The laser light 180 as coupled from optical line 107 enters the other face of the SPPR 160, passes through the SPPR 160, and the light exits from a region 185 of the spiral surface 165 of the SPPR and is reflected by the mirror 170 into the desired field of view generally about a plane. Since the surfaces are partially reflecting, some of the light passes through the cavity formed between the surfaces several times before being emitted. Because rays of the light experience different delays depending on the angle, the wave fronts of beams emitted on each pass have spiral phase structures. Beams that take several passes have larger phase shifts. The emitted field is the interference of these beams that produces a pattern of petals or a single petal/beam. In this exemplary embodiment, the plane is perpendicular to the axis 175. The dashed lines in FIGS. 4 and 5 show two representative regions 185 of the spiral surface 165 from which different beams are transmitted. These beams correspond to two different frequencies of the laser 105 that produce a beam 125 in FIG. 4 that is 180 degrees opposite to beam 125 in FIG. 5. The beams as emerge from the spiral surface 165 are substantially parallel to the axis 125, are on opposing sides of the axis 125, and are then reflected by conical mirror 170 to form respective beams directed in opposite directions substantially in a plane parallel to the bottom surface of the SPPR 160.

The surface of the mirror could either be flat or curved and made to be rough to cause a broadening spread of the laser light beam. The mirror itself may be segmented in a direction parallel to the axis of the SPPR such that the beam is expanded in that direction. It may also be segmented so that a finite number of angles are addressable. Curvature of the reflecting surface can be used to focus the beam if desired. The mirror may also be fabricated in such a way as to disperse the light using a grating structure; using multiple narrow linewidth sources of different wavelength with a grating of this type would permit the beams to scan in a plurality of directions. The "linewidth" refers to the frequency width of the laser source going into the SPPR. With more than one center wavelength with linewidth, there would be additional beams emerging from the device. When there is a grating structure on the mirror, the light could be further dispersed in a plurality of directions.

Tuning the laser frequency via the value of the signal on line 145 causes the SPPR device to rotate the region that emits the light and with the aid of the fixed reflective surface/mirror enables the scanning of the optical beam profile from 0 to 360 degrees in the field of regard (FOR). Tuning the frequency of a DFB diode laser can be done by changing the current going into the laser diode or changing the temperature of the laser diode. For example, a change in current by a few milliampere (mA) can tune a diode DFB laser frequency by several GHz, and a change of 0.1 Kelvin of temperature can tune the laser frequency by several GHz. The laser can be frequency tuned directly, or acousto-optical devices or electro-optical devices could be used to tune the frequency of the laser beam going into the SPPR. Adjusting the laser frequency using an acousto-optic device would typically involve putting an acousto-optic frequency (AOF) shifter in front of the laser to shift the frequency of the laser beam. The controller would provide a signal to the acousto-optic frequency shifter.

In this embodiment, light is injected into a component. This component introduces multiple states of optical angular momentum to the input light such that on the output of the component, the interference of the multiple states of optical angular momentum produce a pattern of one or several petals that are distributed around the optical axis of the component. The angular orientation of the light beams exiting the output surface depends on the input frequency of the light source. One such component is the exemplary spiral phase plate resonator where one surface of a spiral phase plate resonator receives the light and the exiting light comes from the opposing surface. Since the scan rate is controlled by the rate that the light source wavelength can be modulated/changed, the scan rate can be fast. In one embodiment a laser can be scanned at greater than MHz speeds (faster than 1 microsecond) over a range of wavelengths that correspond to a 360 degree sweep in angle.

Figure 6:
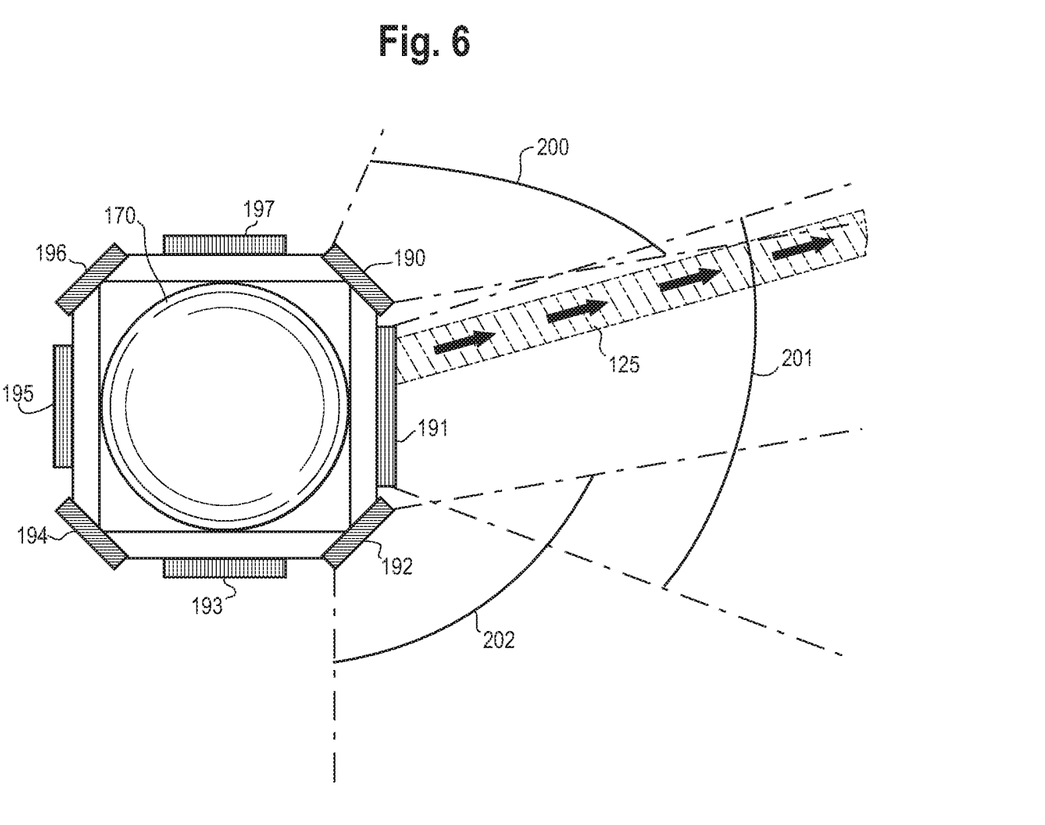
FIG. 6 is a top view of the embodiment of the present invention utilized in a LIDAR system.

FIG. 6 is a top view of one embodiment of the present invention utilized in a LIDAR system. To collect the return light from beam 125, optical detectors 190-197 are oriented in such a way that collectively a full 0 to 360 degrees field of view is covered. For example, optical detectors 190, 191 and 192 can detect reflected light in the FOV 200, 201 and 202, respectively, where after a short distance from the mirror 170 the FOV of 200 and 201 overlap as does the FOV of 201 and 202. In areas where two adjacent optical detectors each sense the same reflected light, results from the two optical detectors may both be used to determine the heading/direction of the reflected light. There are several types of ranging data that can be used. One example is amplitude modulation where the diode laser is amplitude modulated such that it emits pulses of light. The modulation amplitude goes to the target via the SPPR and gets reflected back to the detector. The detector can be configured to detect the rising edge of the return amplitude pulse signal. From the timing between the transmitted amplitude and the received amplitude, a distance range is determined and stored in the memory.

Feedback locking schemes may be employed by the controller 140 to stabilize the laser frequency and avoid jitter in the laser intensity, frequency, and phase during operation of the optical system. Depending on the application, the laser light source can be operated in environments which have vibrations. In applications where a spatially incoherent light is preferred at the target to avoid speckle generation, a transparent diffuser can be placed around the mirror, or the roughness of the mirror adjusted.

Figure 7:
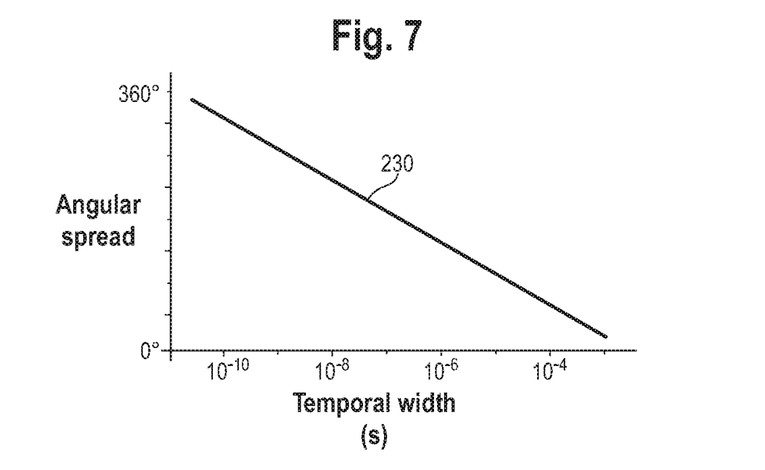
FIG. 7 is a graph showing the angular spread of light versus the pulse time duration of the light.

FIG. 7 is a graph 230 that shows the angular spread of light versus the pulse time duration of the laser light output. The angular spread is defined as the laser beam expanding about a range of azimuthal angles on the output plane of the SPPR. In other words, the beam width of beam 125 before it hits the conical mirror is the angular spread of the beam. The beam in FIGS. 4-6 shows a beam with a relatively small angular spread. For example, as the beam emerges from the SPPR, the beam could be wide or narrow depending on the input laser parameters and SPPR parameters. A small angular spread implies that the beam emerging from the SPPR is narrow and covers a small range of angles. A large angular spread means that the beam comes out over a large range of angles, and could potentially cover a full range of 360 degree angles. As described briefly above, if a grating structure is fabricated on the conical mirror, the beam could be made to refocus the light beam over a narrow range of angles for a beam with modest angular spread, or create a divergent beam for a beam with small angular spread. As seen, the angular spread decreases with increasingly longer pulse times.

Figure 8:
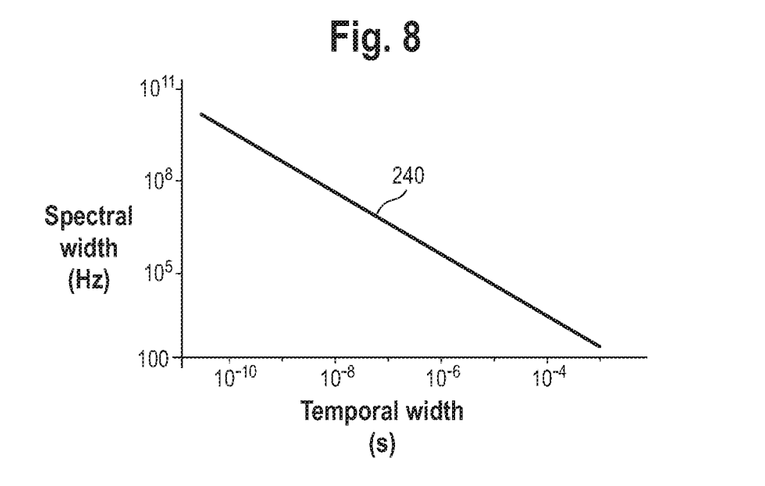
FIG. 8 is a graph showing the spectral width of light versus the pulse time duration of the light.

FIG. 8 is a graph 240 that shows the transform limited spectral width of light versus the pulse time duration of the laser light. As seen, the spectral width in Hertz decreases with increasingly longer pulse times.

Figure 9:
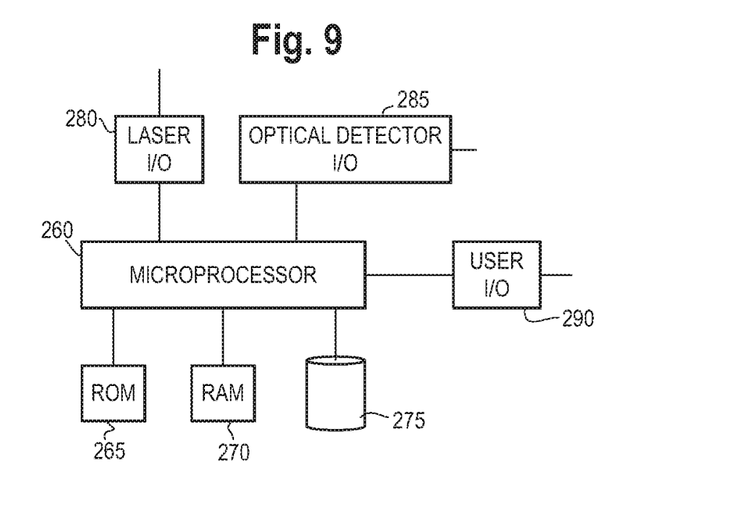
FIG. 9 is a block diagram of an exemplary system for controlling and processing an exemplary LIDAR that incorporates an embodiment of the present invention.

FIG. 9 is a block diagram showing an exemplary embodiment of the controller 140. A microprocessor 260 is supported by data stored in read-only memory (ROM) 265, random-access memory (RAM) 270, and nonvolatile memory storage device 275 such as a disk drive. A laser input/output interface 280 supports communications between the microprocessor 260 and the laser 105. An optical detector input/output interface 285 supports communications between the microprocessor 260 and the optical detector 125. A user input/output interface 290 supports communications between the microprocessor 260 and a human user. The interface 290 may support input to the microprocessor 260 such as by a keyboard, mouse, data transmission stream, etc. and may support output from the microprocessor 260 in the form of output data, visual image information such as displayed on a screen or printed on a printer. As is known, the microprocessor 260 and its supporting environment of components may operate under the control of one of known operating systems. An application program in accordance with an embodiment of the present invention that runs in accordance with the operating system can utilize the microprocessor 260 to generate a series of command signals transmitted by the laser I/O 280 to the laser 105 to sequentially control a change in frequency of the laser from a first frequency associated with a heading of 0° to final frequency associated with a heading of 360°. As will be appreciated, different interim frequencies between the first frequency and the final frequency will correspond to various degree headings between 0° and 360°. Depending on the granularity of control between different headings of the beam, a stored data table (such as generated as part of initial calibration) may be utilized to generate a corresponding command signal values to control the frequency of the laser with each value associated with a stored heading. Since the beam headings will be known based on the corresponding command signals, corresponding light beam reflections from the known headings can also be anticipated to be received from the optical detector I/O 285. Knowing the heading of anticipated light beam reflections can assist in parsing which of the different output data from the optical detectors 190-197 should be processed to determine ranging information of the object giving rise to the reflection.

Figure 10:
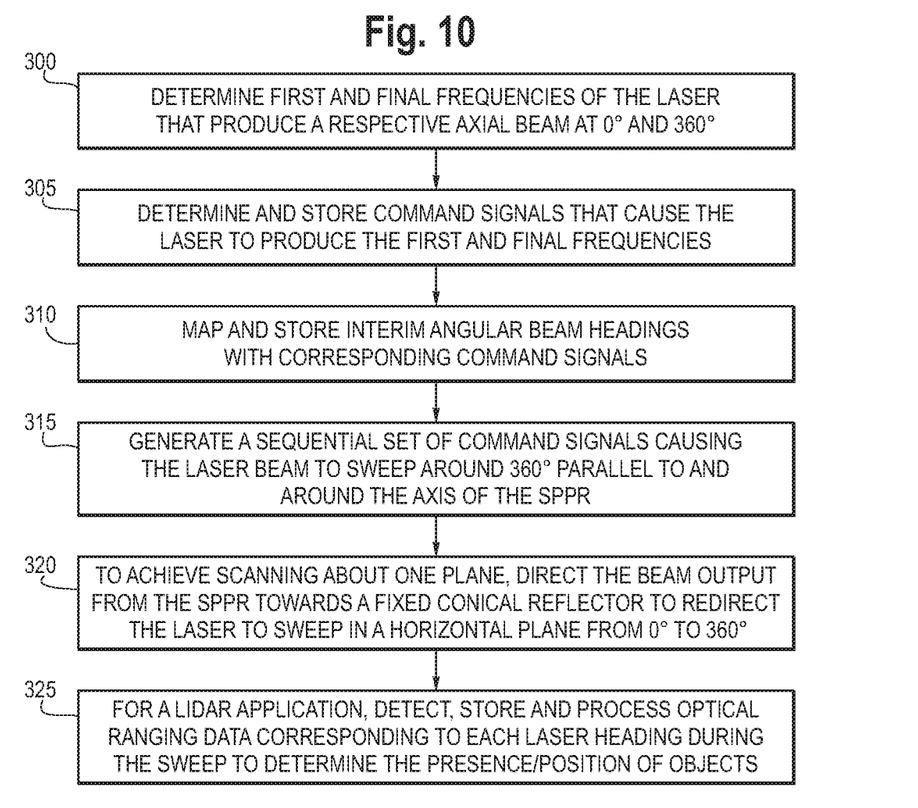
FIG. 10 is a flow diagram of exemplary steps for controlling the scanning of a light beam in accordance with an embodiment of the present invention.

FIG. 10 is a flow diagram of exemplary steps for controlling the scanning of a light beam in accordance with an embodiment of the present invention. In step 300 the first and final frequencies of the laser are determined that will produce a respective axial beam of 0° and 360°. The axial beam refers to the location of the laser light beam as it exits the SPPR spiral surface 165 about the axis 175. Depending upon the frequency of the laser, the laser light beam will exit from the SPPR spiral surface 165 at a location on the perimeter of a circle with the point of origin at axis 175. In step 305 command signals are determined and stored that caused the laser to produce the first and final frequencies. These command signals define a range of signal values that can be generated to cause the scanning of the laser beam 360° around the axis 175. In step 310 interim angular beam headings are mapped and stored with corresponding command signals. Depending upon the granularity of the rate of scan all the laser beam, there will exist a substantial plurality off such interim headings and corresponding signals, e.g. 360 interim headings and corresponding signals would correspond to 1° increments. The preceding steps may be considered as part of a calibration process by which signal values are determined that give rise to corresponding laser frequencies which in turn result in the output of the laser through the SPPR sweeping 360° around the axis 175. If it is desired, it will be apparent command signals can be generated to cause the output of the laser to rotate substantially uniformly about 360° or the output of the laser could be rotated in a discontinuous manner, e.g. 0°, 90°, 45°, 180°, 135°, etc. or the output of the laser could be rotated over a range less than 360°. The controller could be configured to use the data obtained from the return signals to control the source frequency in such a way that the scanner points to objects of interest, varies the scan rate, or optimizes the scan profile.

In step 315 a sequential set of command signals are generated and stored to cause the laser beam to sweep around 360° parallel to and around the axis of the SPPR. In step 320, in order to achieve scanning of the laser beam about one plane, the output beam from the SPPR is directed towards a fixed conical reflector that redirects the laser beam to sweep in a horizontal plane from 0° to 360°. The conical reflector may for example be a conical mirror having a conical surface that forms approximately 45° outwardly expanding surface from the axis 175 so that the laser beam is redirected about a horizontal plane substantially parallel to the bottom planar surface of the SPPR 160. It will be understood that the reference to the "horizontal plane" is made merely for convenience and that the actual plane of sweep of the laser beam may be in any desired orientation.

As indicated at step 325, for a LIDAR application, optical ranging data based on reflected laser light will be detected, stored and processed corresponding to each laser heading during the sweep to determine the presence/position of objects at the respective headings. Although an embodiment of the present invention has been explained as suited for use in a LIDAR application, it will be apparent to those skilled in the art that various other applications and uses can benefit from controllably scanning a laser beam about a substantial field of regard without utilizing any physically moving components, such as a rotating reflector or rotation of the laser beam itself.

Although exemplary implementations of the invention have been depicted and described in detail herein, it will be apparent to those skilled in the art that various modifications, additions, substitutions, and the like can be made without departing from the spirit of the invention. For example, the device can be designed to produce more than one laser beam by a number of ways. One way is by using flexibility in the wavelength of light, and the other way is by re-engineering the SPPR device. For a device with uniform refractive index, the number of beams that the SPPR device produces is determined by the equation $\beta=2*n*\Delta h/\lambda$ where $\beta$ is the number of beams, n is the refractive index of the device, $\Delta h$ is the step height, and $\lambda$ is the wavelength of laser light. By changing any one of these parameters, the number of beams can be changed. FIGS. 4-6 shows the parameters in the above equation such that there is only one beam emerging from the SPPR, i.e. $\beta=1$. Multiple narrow linewidth wavelength sources could also be used to create multiple output beams.

The scope of the invention is defined in the following claims.

The invention claimed is:

1. An optical apparatus comprising:
   a physically fixed coherent light source that generates light having a frequency that is controlled in response to command signals that correspond to different respective frequencies;
   a physically fixed spiral phase plate resonator (SPPR) having one surface that receives the light from the coherent light source and another surface from which at least a portion of the light exits, the light exits from different regions of the another surface dependent on the frequency of the light;
   a fixed reflector mounted adjacent the another surface that reflects the light exiting the another surface at about a 90 degree angle relative to the path of the light as it exits the another surface;
   a source of the command signals that sends different values of command signals to the physically fixed coherent light source to control corresponding frequencies of the light, the frequency of the light determining a particular region about a center axis of the SPPR from which the light exits the another surface and a corresponding location on the fixed reflector where the light will be reflected, the light being scanned about a plane by the optical apparatus that has no physically moving components by changing the frequency of the light.

2. The optical apparatus of claim 1 wherein the physically fixed coherent light source is a laser that generates an output light that has a frequency controlled in response to respective values of the command signals.

3. The optical apparatus of claim 1 wherein the center axis is generally perpendicular to the another surface, the particular region being within a circular region about the center axis.

4. The optical apparatus of claim 3 wherein the fixed reflector has a 360 degree conical reflecting surface with a conical axis in line with the center axis.

5. The optical apparatus of claim 4 wherein the source of the command signals controls the sending of different values of command signals to the physically fixed coherent light source to control corresponding frequencies of the light so that the regions from which the light exits the another surface is within 360 degrees about the center axis so that the light as reflected by the conical reflecting surface is substantially in one plane and in a direction perpendicular to the center axis.

6. The optical apparatus of claim 5 wherein the reflected light is directed in an outward direction within 360 degrees about the center axis with the direction being determined based on the frequency of the light as controlled by the value of the command signal.

7. The optical apparatus of claim 1 further comprising:
   optical detectors that generate data corresponding to detection of at least a portion of the light returning after being reflected from an object;
   a processor that determines distance of the object relative to the optical apparatus based on the data that is accessible to the processor.

8. A method for directing an optical beam at different headings within a plane using an optical apparatus that uses no physically moving components, the method comprising the steps of:
   delivering a coherent light from a source that provides control of the light's frequency to one surface of a physically fixed spiral phase plate resonator which has another surface from which at least a portion of the light exits, the light exiting from different regions around a center axis of the another surface dependent on the frequency of the light;
   redirecting the exiting light by a fixed reflector that is mounted adjacent the another surface, a surface of the fixed reflector redirecting the exiting light at about a 90 degree angle relative to the path of the light as it exits the another surface;
   delivering command signals by a processor controlled apparatus with different values to the coherent light source where the frequency of the coherent light corresponds to the value of the command signal, the frequency of the light determining a particular region from which the light exits the another surface and a corresponding location on the fixed reflector where the light will be reflected, delivering the different values of command signals to cause corresponding different frequencies of the light causing the light to be scanned about a plane by the optical apparatus that has no physically moving components.

9. The method of claim 8 wherein the coherent light is light from a laser that generates an output light that has a frequency controlled in response to respective values of the command signals.

10. The method of claim 8 wherein the center axis is generally perpendicular to the another surface, the particular region being within a 360 degree circular region about the center axis.

11. The method of claim 10 wherein the redirecting of the exiting light is effectuated by a fixed reflector with a 360 degree conical reflecting surface with a conical axis in line with the center axis.

12. The method of claim 11 wherein the different values of command signals correspond to different respective frequencies of the light so that the regions from which the light exits the another surface is within 360 degrees about the center axis so that the light as reflected by the conical reflecting surface is substantially in one plane and in a direction perpendicular to the center axis.

13. The method of claim 12 wherein the reflected light is directed in an outward direction within 360 degrees about the center axis with the direction being determined by the frequency of the light as controlled by values of the command signal.

14. The method of claim 8 further comprising:
generating data by optical detectors that correspond to detection of at least a portion of the light returning after being reflected from an object;
determining by a processor a distance of the object relative to the optical apparatus based on the data that is accessible to the processor.

15. An optical apparatus comprising:
a physically fixed coherent light source that generates light having a frequency that varies within a range of frequencies;
a physically fixed spiral phase plate resonator (SPPR) having one surface that receives the light from the coherent light source and another surface from which at least a portion of the light exits, the light exits from different regions of the another surface dependent on the frequency of the light;
a fixed reflector mounted adjacent the another surface reflects the light exiting the another surface at about a 90 degree angle relative to the path of the light as it exits the another surface, a corresponding location on the fixed reflector where the light will be reflected varies dependent upon the frequency of the light so that the light is scanned about 360 degrees within a plane by the optical apparatus that has no physically moving components by changing the frequency of the light.

16. The optical apparatus of claim 15 wherein the center axis is generally perpendicular to the another surface, the particular region being within a circular region about the center axis and the fixed reflector has a 360 degree conical reflecting surface with a conical axis in line with the center axis.

17. The optical apparatus of claim 15 further comprising a source of command signals coupled to the light source where the command signals control the different frequencies of the physically fixed coherent light source so that the regions from which the light exits the another surface in a direction perpendicular to a center axis.

18. The optical apparatus of claim 15 further comprising optical detectors that generate data corresponding to detection of at least a portion of the light returning after being reflected from an object;
a processor that determines distance of the object relative to the optical apparatus based on the data that is accessible to the processor.

19. A method for directing an optical beam at different headings within a plane using an optical apparatus that uses no physically moving components, the method comprising the steps of:
delivering a coherent light from a source that provides control of the light's frequency to one surface of a physically fixed spiral phase plate resonator which has another surface from which at least a portion of the light exits, the light exiting from different regions around a center axis of the another surface dependent on the frequency of the light;
redirecting the exiting light by a fixed reflector that is mounted adjacent the another surface, a surface of the fixed reflector redirecting the exiting light at about a 90 degree angle relative to the path of the light as it exits the another surface, the frequency of the light determining a particular region from which the light exits the another surface and a corresponding location on the fixed reflector where the light will be reflected, the delivered light varying in frequency over a range of frequencies causing the light to be scanned about a plane by the optical apparatus that has no physically moving components.

20. The method of claim 19 wherein a center axis is generally perpendicular to the another surface, the particular region being within a 360 degree circular region about the center axis.

21. The method of claim 20 wherein the redirecting of the exiting light is effectuated by a fixed reflector with a 360 degree conical reflecting surface with a conical axis in line with the center axis.

22. The method of claim 19 further comprising the step of generating command signals coupled to the source with the different values that correspond to different respective frequencies of the light, the regions from which the light exits the another surface is within 360 degrees about a center axis so that the light as reflected by a conical reflecting surface is substantially in one plane and in a direction perpendicular to the center axis.

23. The method of claim 19 further comprising the steps of:
generating data by optical detectors that correspond to detection of at least a portion of the light returning after being reflected from an object;
determining by a processor a distance of the object relative to the optical apparatus based on the data that is accessible to the processor.

* * * * *